United States Patent [19]

Gies et al.

[11] Patent Number: 5,614,166
[45] Date of Patent: Mar. 25, 1997

[54] CRYSTALLINE SOLIDS HAVING THE RUB-13 STRUCTURE

[75] Inventors: Hermann Gies, Sprockhövel; Silke Vortmann, Essen; Bernd Marler, Leichlingen; Ulrich Müller, Neustadt; Uwe Dingerdissen, Seeheim-Jugenheim, all of Germany

[73] Assignee: BASF Aktiengesellschaft, Ludwigshafen, Germany

[21] Appl. No.: 499,827

[22] Filed: Jul. 10, 1995

[30] Foreign Application Priority Data

Jul. 14, 1994 [DE] Germany .............. 44 24 815.6

[51] Int. Cl.$^6$ .................................................. C01B 39/46
[52] U.S. Cl. .................. 423/718; 423/706; 423/708; 423/713
[58] Field of Search ................... 423/718, 706, 423/708, 713

[56] References Cited

U.S. PATENT DOCUMENTS

| | | | |
|---|---|---|---|
| 3,328,119 | 6/1967 | Robson | 423/713 |
| 4,016,245 | 4/1977 | Plank et al. | 423/708 |
| 4,285,919 | 8/1981 | Klotz et al. | 423/277 |
| 4,401,637 | 8/1983 | Marosi et al. | 423/713 |
| 4,456,582 | 6/1984 | Marosi et al. | 423/708 |
| 4,568,654 | 2/1986 | Valyocsik | 423/706 |
| 4,622,214 | 11/1986 | Comyns et al. | 423/706 |
| 4,645,655 | 2/1987 | Whittam | 423/708 |
| 4,661,467 | 4/1987 | Kuehl | 423/713 |
| 4,859,442 | 8/1989 | Zones et al. | 423/718 |

FOREIGN PATENT DOCUMENTS 0068796  6/1982  European Pat. Off. .

OTHER PUBLICATIONS

Gies, H., Journal of Inclusion Phenomena, 5 (1987), (no month) pp. 283–287.
Angew. Chem. 100 (1988), 232–251, Holderich et al. (No Month).

Primary Examiner—Mark L. Bell
Assistant Examiner—David Sample
Attorney, Agent, or Firm—John H. Shurtleff

[57] ABSTRACT

A crystalline solid comprising a boro-, alumino-, gallo-, titano-, vanado- or zincosilicate or a mixture thereof having the RUB-13 structure, which has a monoclinic space group and exhibits an X-ray diffraction pattern in which at least the following reflections (hkl) occur at the stated diffraction angles:

| h | k | l | Intensity $I/I_o$ | d-spacings ($d_{hkl}$) |
|---|---|---|---|---|
| 0 | 2 | 0 | very strong | 10.26 |
| 0 | 1 | 1 | very strong | 9.79 |
| −1 | 3 | 1 | weak | 4.98 |
| 0 | 4 | 1 | medium | 4.53 |
| −2 | 0 | 1 | medium | 4.52 |
| −1 | 1 | 2 | medium | 4.46 | and their uses.

9 Claims, 1 Drawing Sheet

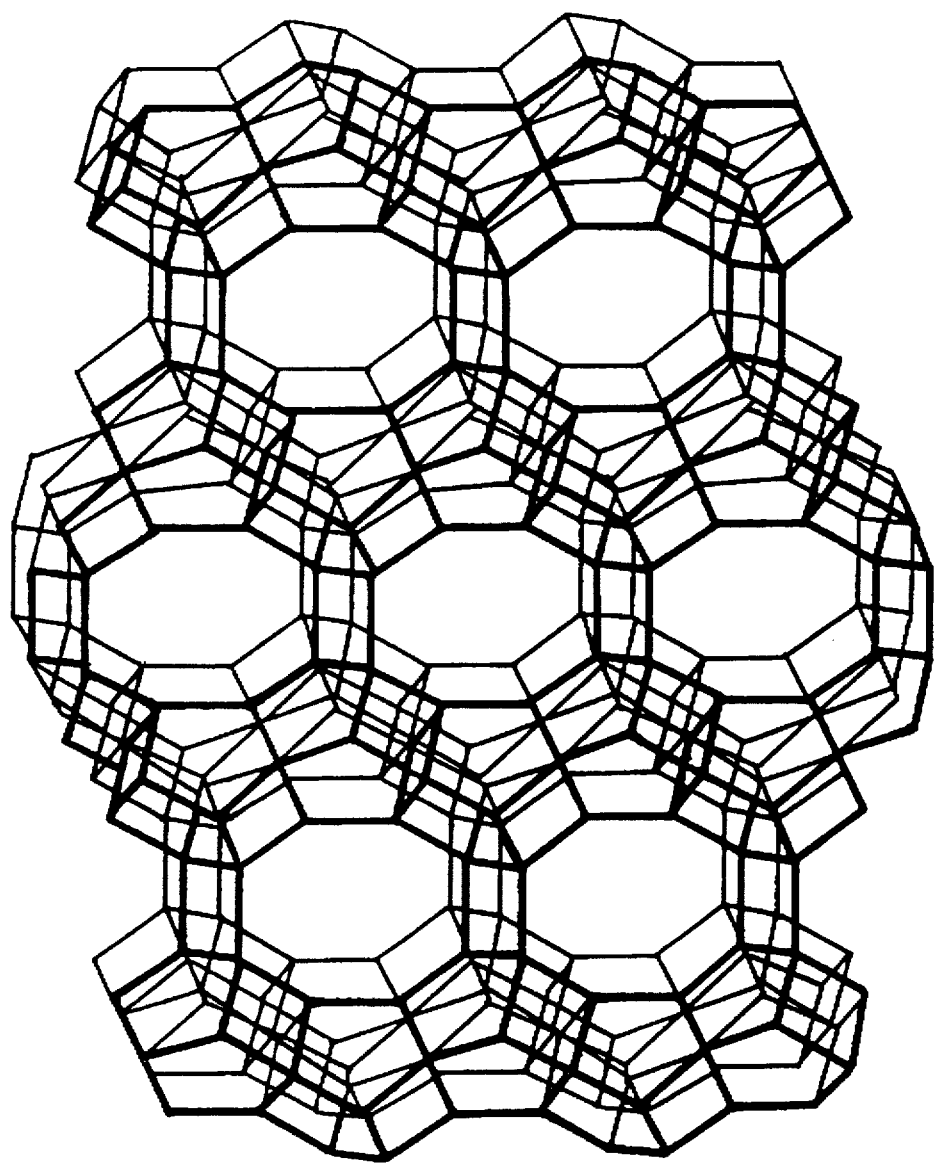

CRYSTALLINE SOLIDS HAVING THE RUB-13 STRUCTURE

The present invention relates to crystalline solids comprising a boro-, alumino-, gallo-, titano-, vanado- or zincosilicate or a mixture thereof having the RUB-13 structure, which have a monoclinic space group and exhibit a characteristic X-ray diffraction pattern.

Angew. Chem. 100 (1988), 232–251, discloses boron-containing zeolites as heterogeneous catalysts. In particular, boron zeolites having the pentasil structure are used (U.S. Pat No. 4,285,919 and EP-A-68 796). Such borosilicates having the pentasil structure are prepared by crystallizing a synthesis gel consisting of water, a boron source and silica in a suitable manner with the addition of organic, nitrogen-containing compounds under hydrothermal conditions and, if required, with the addition of an alkali or fluoride as a mineralizer. Examples of suitable nitrogen-containing compounds are 1,6-diaminohexane (EP-A-7 081) and the tetrapropylammonium salts.

The above boron-containing zeolites or boron zeolites having the pentasil structure have the disadvantages of being medium-pore zeolites with 10 MR channel openings. Shape-selective reactions, in particular of small molecules, are therefore impossible or difficult to carry out.

It is an object of the present invention to remedy the above-mentioned disadvantages.

We have found that this object is achieved by novel and improved crystalline solids comprising a boro-, alumino-, gallo-, titano-, vanado- or zincosilicate or a mixture thereof having the RUB-13 structure, which have a monoclinic space group and exhibit an X-ray diffraction pattern in which at least the following reflections (hkl) occur with the intensity $(I/I_O)$ at the stated d-spacings $(d_{hkl})$

| h  | k | l | Intensity $I/I_o$ | d-spacings $(d_{hkl})$ |
|----|---|---|-------------------|------------------------|
| 0  | 2 | 0 | very strong       | 10.26                  |
| 0  | 1 | 1 | very strong       | 9.79                   |
| -1 | 3 | 1 | weak              | 4.98                   |
| 0  | 4 | 1 | medium            | 4.53                   |
| -2 | 0 | 1 | medium            | 4.52                   |
| -1 | 1 | 2 | medium            | 4.46                   | and their uses.

The novel crystalline solids comprising a boro-, alumino-, gallo-, titano-, vanado- or zincosilicate or a mixture thereof having the RUB-13 structure can be prepared as follows:

The novel crystalline solids comprising a boro-, alumino-, gallo-, titano-, vanado- or zincosilicate, in particular the borosilicate, referred to below as RUB-13, are formed if a piperidine or a methyl-substituted piperidine or a diamine compound or a mixture thereof is added as a template compound to the synthesis batch in a molar Si:piperidine ratio from 0.4:1 to 0.8:1, and essentially in the absence of an alkali metal or alkaline earth metal compound, ie. no alkali metal or alkaline earth metal compounds are added to the mixture. The molar ratio Si:(Si+A), in particular Si:(Si+B), is as a rule from 0.6:1 to 2:1, preferably from 0.95:1 to 1:1. The template compounds are mixtures of amine and diamine compounds, as a rule in a molar ratio of from 0.1:1 to 20:1, preferably from 1:1 to 10:1, particularly preferably from 3:1 to 6:1, preferably comprising ethylenediamine with pentamethylpiperidine, in particular comprising ethylenediamine with 1,2,2,6,6-pentamethylpiperidine. In the event of deviations from the abovementioned molar ratios and conditions, formation of dodecasil-1H, described ill J. Incl. Phenomena 5 (1987), 283–287, may occur.

It is advantageous to establish the following molar ratios in the synthesis gel before the beginning of the crystallization:

$SiO_2:AO_n$ is from 5:1 to 0.1:1, preferably from 0.9:1 to 0.3:1 $H_2O:AO_n$ is from 25:1 to 250:1, preferably from 100::1 to 150:1 Amine or diamine compound or a mixture thereof:$SiO_2$ is from 2.5:1 to 1.5:1, preferably from 2:1 to 1.7:1.

A is boron, aluminum, gallium, titanium, vanadium or zinc, preferably boron or aluminum, particularly preferably boron, and n is the valency of A.

Suitable amines are those of the general formula I

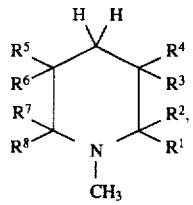 (I)

where $R^1$ to $R^8$ are each hydrogen, methyl or ethyl, preferably hydrogen or methyl, and suitable diamines are those of the general formula II

$H_2N-(CH_2)_r-NH_2$ (II), where r is an integer from 1 to 5, preferably 2 or 3, particularly preferably 2.

The crystallization of the single-phase structure of RUB-13 is effected, as a rule, over a period of from 5 to 120 days and at from 120° to 200° C., preferably from 140° to 180° C., particularly preferably from 150° to 170° C., it being possible to obtain a highly crystalline product after only about 80 days. The duration of the synthesis can be substantially reduced by vigorous stirring during the crystallization.

After the crystallization, the novel phase can be filtered off, washed and dried at from 100° to 120° C., these steps being carried out by methods known per se.

The novel borosilicate of this type gives the X-ray diffraction pattern shown in Table 1, with assignment to monoclinic space group symmetry and the unit cell dimensions a=9.659 Å, b=20.46 Å, c=9.831Å and beta=96.58°.

The novel material may furthermore be subjected to a thermal treatment in air or under nitrogen in order to remove the amine or diamine compounds still present in the pores. It is advantageous to burn off the template under conditions which limit the temperature increase to below 850° C.

The prior art methods for shaping, ion exchange and/or impregnation with metals, noble metals, alkali metals or alkaline earth metals, surface modification, for example by means of CVD, or chemical derivatization, for example silylation, may be used for modifying the novel boro-, alumino-, gallo-, titano-, vanado- and zincosilicates, in particular borosilicates.

Advantageous catalytic applications of the novel boro-, alumino-, gallo-, titano-, vanado- and zincosilicates or of mixtures thereof having the RUB-13 structure are reactions which both require the catalytic properties of the elements boron, aluminum, gallium, titanium, vanadium and zinc, in particular of boron, and can take place utilizing shape selectivity in the pore structure of the RUB-13.

These are in particular amination reactions, which are described from the point of view of the reaction in, for example, Chem. Abstr., Vol. 118, 6620d or U.S. Pat. No. 4 375 002. The novel material has the advantage that boron is incorporated and fixed in the silicate lattice directly in the synthesis and advantageously imparts slight to moderate acidity to the zeolite.

The novel material in appropriately modified form may also be used for hydrogenations, dehydrogenations, oxydehydrogenations, polymerization reactions, hydrations and dehydrations, esterifications and transesterifications, nucleophilic and electrophilic substitution reactions, addition and elimination reactions, isomerization of double bonds and skeletal isomerization, dehydrocyclizations, dehydrohalogenations, epoxide-aldehyde rearrangement reactions and condensation reactions of the aldol condensation type.

The novel material may also be used for the conversion of methanol to olefins, for the oligomerization of olefins or for the preparation of ethers from alcohols and olefins, and for the synthesis of aromatics starting from olefins.

Under suitable conditions or after suitable modification of the material, reactions such as catalytic cracking, hydrocracking or reforming can also be carried out.

Moreover, the novel material, if necessary modified with Cu or metals of the Pt group, is used as catalyst or carrier for the catalytic treatment of waste gas in $DeNO_x$ or $DeSO_x$ processes.

Depending on the molecule to be converted, the catalytic reactions can advantageously be carried out in the gas or liquid phase or in the supercritical phase.

In the case of use as a sorbent, the large internal surface area of the novel material can advantageously be utilized, but it is also possible to separate molecules from one another on the basis of the difference in their molecular size. In particular, small molecules having kinetic diameters of from 4 to 5 Å are preferentially adsorbed.

Depending on the molecule, the adsorption can be carried out in the gas or liquid phase. Deactivated catalysts or adsorbents comprising the novel borosilicate can be converted back into an active form by burning off carbon deposits in a controlled manner at from 350° to 650° C.

EXAMPLES

Example 1

In a polypropylene beaker, 10 ml of a 1 molar aqueous solution of ethylenediamine are added to 0.74 ml of tetramethoxysilane (Fluka, 99.5%) while stirring. 4.1 ml of a boric acid solution saturated at room temperature are added to the homogeneous solution, and 0.38 µl of pentamethylpiperidine (Aldrich) is introduced. The reaction solution is welded into quartz glass ampoules and reacted in an oven at 160° C. in the course of 89 days. After cooling, the ampoule is opened and the product is filtered off, washed neutral and dried overnight at 120° C. The synthetic product has the X-ray diffraction pattern shown in Table 1 and typical of RUB-13.

TABLE 1

| Structure and indexing of RUB-13 | | | |
|---|---|---|---|
| 2θ (obs.) [°] | $d_{hkl}$ (obs.) [Å] | Rel. intensity | hkl |
| 8.611 | 10.2605 | 100 | 020 |
| 9.021 | 9.7995 | 95 | 001 |
| 10.148 | 8.7096 | 38 | 110 |
| 14.302 | 6.1879 | 16 | 130 |
| 15.900 | 5.5694 | 18 | 131 |
| 17.796 | 4.9801 | 30 | −131 |
| 19.575 | 4.5313 | 90 | 041 |
| 19.623 | 4.5203 | 40 | −201 |
| 19.881 | 4.4623 | 40 | −112 |
| 20.122 | 4.4094 | 45 | 022 |

TABLE 1-continued

| Structure and indexing of RUB-13 | | | |
|---|---|---|---|
| 2θ (obs.) [°] | $d_{hkl}$ (obs.) [Å] | Rel. intensity | hkl |
| 20.425 | 4.3446 | 20 | 220 |
| 21.461 | 4.1372 | 7 | −221 |
| 23.231 | 3.8258 | 26 | 221 |
| 23.390 | 3.8002 | 9 | −132 |
| 25.046 | 3.5525 | 12 | 132 |
| 25.181 | 3.5338 | 40 | 042 |
| 24.419 | 3.4968 | 17 | 240 |
| 25.718 | 3.4612 | 35 | 151 |
| 25.983 | 3.4265 | 14 | −222 |

The structure of the crystalline material is shown in FIG. 1. FIG. 1: Structure of RUB-13 parallel to the [001] axis.

We claim:

1. A crystalline solid comprising a boro-, alumino-, gallo-, titano, -vanado or zincosilicate or a mixture thereof having the RUB-13 structure which possesses a monoclinic space group and exhibits an X-ray diffraction pattern in which at least the following reflections (hkl) occur with the intensity ($I/I_o$) at the stated d-spacings ($d_{hkl}$):

| h | k | l | Intensity $I/I_o$ | d-spacings ($d_{hkl}$) |
|---|---|---|---|---|
| 0 | 2 | 0 | very strong | 10.26 |
| 0 | 1 | 1 | very strong | 9.79 |
| −1 | 3 | 1 | weak | 4.98 |
| 0 | 4 | 1 | medium | 4.53 |
| −2 | 0 | 1 | medium | 4.52 |
| −1 | 1 | 2 | medium | 4.46 |

2. A crystalline solid as claimed in claim 1, comprising a borosilicate having the RUB-13 structure and a molar ratio of Si:B of from 0.95:1 to 1:1.

3. A borosilicate crystalline solid as claimed in claim 1, with assignment to space group symmetry and the unit cell dimensions a=9.659 Å, b=20.46 Å, c=9.831 Å and beta= 96.580°.

4. A crystalline solid as claimed in claim 1 prepared by hydrothermal crystallization of silica, of a compound $AO_n$, where A is boron, aluminum, gallium, titanium, vanadium or zinc and n is the valency of the element A, and of an amine compound of the formula I

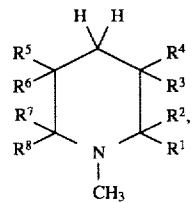

(I)

where $R^1$ to $R^8$ are each hydrogen or methyl, or of a diamine compound of the formula II

(II), where r is an integer from 1 to 5, or of a mixture thereof, essentially in the absence of an alkali metal compound or alkaline earth metal compound.

5. A crystalline solid as prepared according to claim 4, using the diamine of the formula II in which r is the integer 2 or 3.

6. A crystalline solid as prepared according to claim 4, using piperidine or a mono- to pentamethyl-substituted piperidine as the amine of the formula I.

7. A crystalline solid as prepared according to claim 4, using a mixture of ethylenediamine and pentamethylpiperidine as template compounds.

8. A crystalline solid as prepared according to claim 4, wherein said hydrothermal crystallization is applied to a synthesis gel having the molar composition of its components such that the $SiO_2:AO_n$ ratio is from 5:1 to 0.1:1, the $H_2O:SiO_2$ ratio is from 25:1 to 250:1, and the amine, diamine or mixture:$SiO_2$ ratio is from 2.5:1 to 1.5:1.

9. A crystalline solid as prepared according to claim 4, wherein said hydrothermal crystallization is carried out using a solution of piperidine or a methyl-substituted piperidine in a molar ratio of silicon:piperidine of from 0.4:1 to 0.8:1.

* * * * *

UNITED STATES PATENT AND TRADEMARK OFFICE
CERTIFICATE OF CORRECTION

PATENT NO. : 5,614,166
DATED : March 25, 1997
INVENTOR(S) : Gies et al

It is certified that error appears in the above-indentified patent and that said Letters Patent is hereby corrected as shown below:

In the Abstract and in Claim 4, each occurrence:
  correct the heading in the first line of the table as follows:
    after "d-spacings" in the last column of the table, cancel the parenthetical "$(d_{hkl})$" and substitute -- $(d'_{hkl})$ --.

In Claim 4, line 1 (line 41 of col. 4): before the word "prepared", insert
  -- which has been --

Signed and Sealed this

Twelfth Day of August, 1997

BRUCE LEHMAN

*Attest:*

*Attesting Officer*        Commissioner of Patents and Trademarks